United States Patent
Han

(10) Patent No.: US 8,248,449 B2
(45) Date of Patent: Aug. 21, 2012

(54) TRANSMITTING DATA FILE DURING CALL

(75) Inventor: Sang Youn Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1202 days.

(21) Appl. No.: 12/044,875

(22) Filed: Mar. 7, 2008

(65) Prior Publication Data

US 2008/0222688 A1 Sep. 11, 2008

(30) Foreign Application Priority Data

Mar. 8, 2007 (KR) ........................ 10-2007-0022874

(51) Int. Cl.
  *H04N 7/14* (2006.01)
(52) U.S. Cl. .................................................. 348/14.02
(58) Field of Classification Search ............... 348/14.02, 348/14.07; 455/416, 466, 566
  See application file for complete search history.

(56) References Cited

U.S. PATENT DOCUMENTS

| 6,304,752 | B1* | 10/2001 | Rignell .......................... 455/466 |
| 2004/0145654 | A1* | 7/2004 | Motohashi ................. 348/14.02 |
| 2004/0201667 | A1* | 10/2004 | Hasegawa ................... 348/14.02 |
| 2004/0252333 | A1* | 12/2004 | Blume et al. ................. 358/1.15 |
| 2007/0115346 | A1* | 5/2007 | Kim et al. ................... 348/14.02 |
| 2009/0124283 | A1* | 5/2009 | Himeno ..................... 348/14.02 |

* cited by examiner

*Primary Examiner* — Stella Woo
(74) *Attorney, Agent, or Firm* — Lee, Hong, Degerman, Kang & Waimey

(57) ABSTRACT

A method and device for wirelessly communicating data files using a mobile terminal having video communication capability is provided. The method reserves one or more data files to be transmitted during a video call. The communication device associates identifies data files for transmission to a video call recipient, and displays associated information of the data files during the video call.

23 Claims, 16 Drawing Sheets

370

390

TRANSMITTING DATA FILE DURING CALL

CROSS-REFERENCE TO RELATED APPLICATION

Pursuant to 35 U.S.C. §119(a), this application claims the benefit of earlier filing date and right of priority to Korean Patent Application No. 10-2007-0022874, filed on Mar. 8, 2007, the entire contents of which are hereby incorporated by reference in its entirety.

FIELD OF THE INVENTION

This document is directed to wirelessly communicating data files using a mobile terminal having a video communication capability and reserving data files to be transmitted during a call.

DISCUSSION OF RELATED ART

A general mobile communication terminal provides various functions and services, such as sending a message, taking a picture or a moving picture, reproducing an MPEG-1 (Motion Picture Experts Group) Audio Layer 3 (MP3) file, and placing a video call in addition to generally placing a voice call. The video call service allows users to communicate with each other while looking at still or moving video images of each other during the call.

Hereinafter, the video image referred to includes both still and moving video images, unless otherwise specified.

SUMMARY OF THE INVENTION

In one aspect of the present invention a method of wirelessly communicating data files using a mobile terminal having a video communication capability is provided, the method includes identifying at least one data file, associating the identified data file for transmission to at least one video call recipient, establishing a video link between the mobile terminal and a remote terminal of the video call recipient, and displaying information associated with the identified at least one data file when the video link is initiated.

It is contemplated that the method further includes previewing the identified at least one data file on a display while the video link is maintained. It is further contemplated that the identified at least one data file is associated for a plurality of video call recipients.

It is contemplated that method further includes associating different identified data files for transmission to different video call recipients. It is further contemplated that the identified at least one data file includes one of image, moving picture, audio and text file.

It is contemplated that the method further comprises selectively transmitting the identified at least one data file to the remote terminal while the video link is maintained. It is further contemplated that the information associated with the identified at least one data file is displayed in a first display area and an image received from the at least one video call recipient is displayed in a second display area of the mobile terminal. Furthermore, it contemplated that a user image can be displayed in a third display area.

It is contemplated that the method further includes transmitting the identified at least one data file to the remote terminal by drag and dropping the information associated with the identified at least one data file on at least a portion of one of the second and third display areas. It is further contemplated that a selected data file is previewed in the third display area.

It is contemplated that the identified at least one data file is transmitted via one of Multimedia Message Service and Enhanced Message Service. It is further contemplated that the identified at least one data file is transmitted via the video link.

It is contemplated that the step of associating the identified at least one data file for transmission to the at least one video call recipient includes associating the identified at least one data file with a telephone number of the at least one video call recipient. It is contemplated that the method further includes providing a user interface for previewing the identified data file.

It is contemplated that the information displayed comprises a number of the identified data file. It is further contemplated that the displayed information includes an indication of whether there are any identified data files.

In another aspect of the present invention, a mobile terminal is provided including a transceiver receiving and transmitting data for performing a video call, a memory unit storing at least one data file, an input unit identifying the at least one data file, a controller associating the identified at least one data file for transmission to at least one video call recipient, and a display unit displaying information associated with the identified data file, wherein the controller establishes a video link between the mobile terminal and a remote terminal of the at least one video call recipient.

It is contemplated that the controller displays previews of the identified at least one data file on the display while the video link is maintained. It is further contemplated that the identified at least one data file is associated with a plurality of video call recipients.

It is contemplated that the controller associates different identified data files for transmission to different video call recipients. It is further contemplated that the identified at least one data file comprises one of image, moving picture, audio and text file.

It is contemplated that the controller controls selectively transmitting the identified at least one data file to the remote terminal while the video link is maintained. It is further contemplated that the information associated with the identified at least one data file is displayed in a first display area and an image received from the at least one video call recipient is displayed in a second display area of the mobile terminal. It is also contemplated that a user image is displayed in a third display area.

It is contemplated that the controller controls the transceiver to transmit the identified at least one data file to the remote terminal by drag and dropping the information associated with the identified at least one data file on at least a portion of one of the second and third display areas. It is further contemplated that a selected data file is previewed in the third display area.

It is contemplated that the identified at least one data file is transmitted via one of Multimedia Message Service and Enhanced Message Service.

It is contemplated that the controller associates the identified at least one data file with a telephone number of the video call recipient. It is further contemplated that the controller provides a user interface for previewing the identified at least one data file.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed. These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The details of one or more implementations are set forth in the accompanying drawings and the description below. In the entire description of this document, like reference numerals represent corresponding parts throughout various figures.

DETAILED DESCRIPTION OF THE PREFERRED EMBODIMENTS

Reference will now be made in detail to the preferred embodiments of the present disclosure, examples of which are illustrated in the accompanying drawings.

Figure 1:
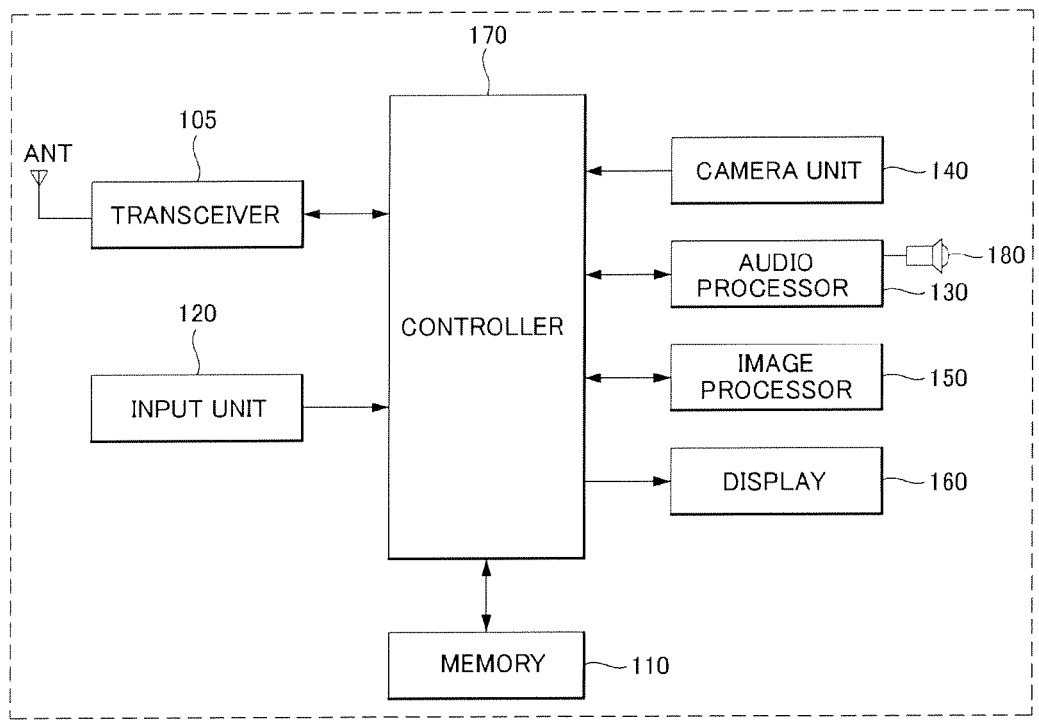
FIG. 1 is a block diagram of a communication device according to the present invention.

FIG. 1 is a block diagram of a communication device 100, according to the present invention. The communication device may be a mobile communication terminal 100, but it is not limited thereto.

The mobile communication terminal 100, as illustrated in FIG. 1, comprises a transceiver 105, a memory 110, an input unit 120, an audio processor 130, a camera unit 140, an image processor 150, a display 160, and a controller 170.

The transceiver 105 receives and transmits data for performing a video call with a call participant through an antenna (ANT) via a base station. The data for performing the video call may include video image and voice data created by a user and the call participant to be exchanged during the video call. The transceiver 105 may transmit one or more data files during the video call.

The memory 110 stores data and programs for controlling overall operations of the mobile communication terminal 100. The memory 110 may store one or more data files, such as music, image, text, and moving picture files.

The memory 110 may include an internal memory and an external memory, such as a Read Only Memory (ROM), an Electrically Erasable Programmable Read Only Memory (EEPROM), and a flash memory.

The input unit 120 includes various number keys and function keys. The input unit 120 receives user input for reserving one or more data files to be transmitted during a video call, and outputs signals corresponding to the user input to the controller 170.

The audio processor 130 decodes audio data stored at the memory 110 into digital audio signals, and converts the digital audio signals into analog audio signals to be reproduced.

The camera unit 140 can be used to form a video image of the user by photographing the user. The camera 140 may include a plurality of cameras.

The image processor 150 processes the video image of the user captured through the camera 140 and a video image of the call participant received through the transceiver 100. The image processor 150 may output image signals of each frame when an input video image is a moving video image.

The display 160 displays various types of information data, such as contents received through the transceiver 105. Additionally, the display 160 may display notification of the reserved data files, a list of the reserved data files, and an indicator for previewing the reserved data files. The display 160 may include a Liquid Crystal Display (LCD) or an Organic Light Emitting Diode (OLED).

The controller 170 controls inputs and outputs of the mobile communication terminal 100. The controller 170 may include a Mobile Station Modem (MSM) for this function.

The controller 170 controls the transceiver 105 to receive and transmit data for performing the video call with the call participant, and further to transmit the reserved one or more data files during the video call. The controller 170 may combine the reserved one or more data files with the data for performing the video call and transmits the combined data through the transceiver 105.

Figure 2:
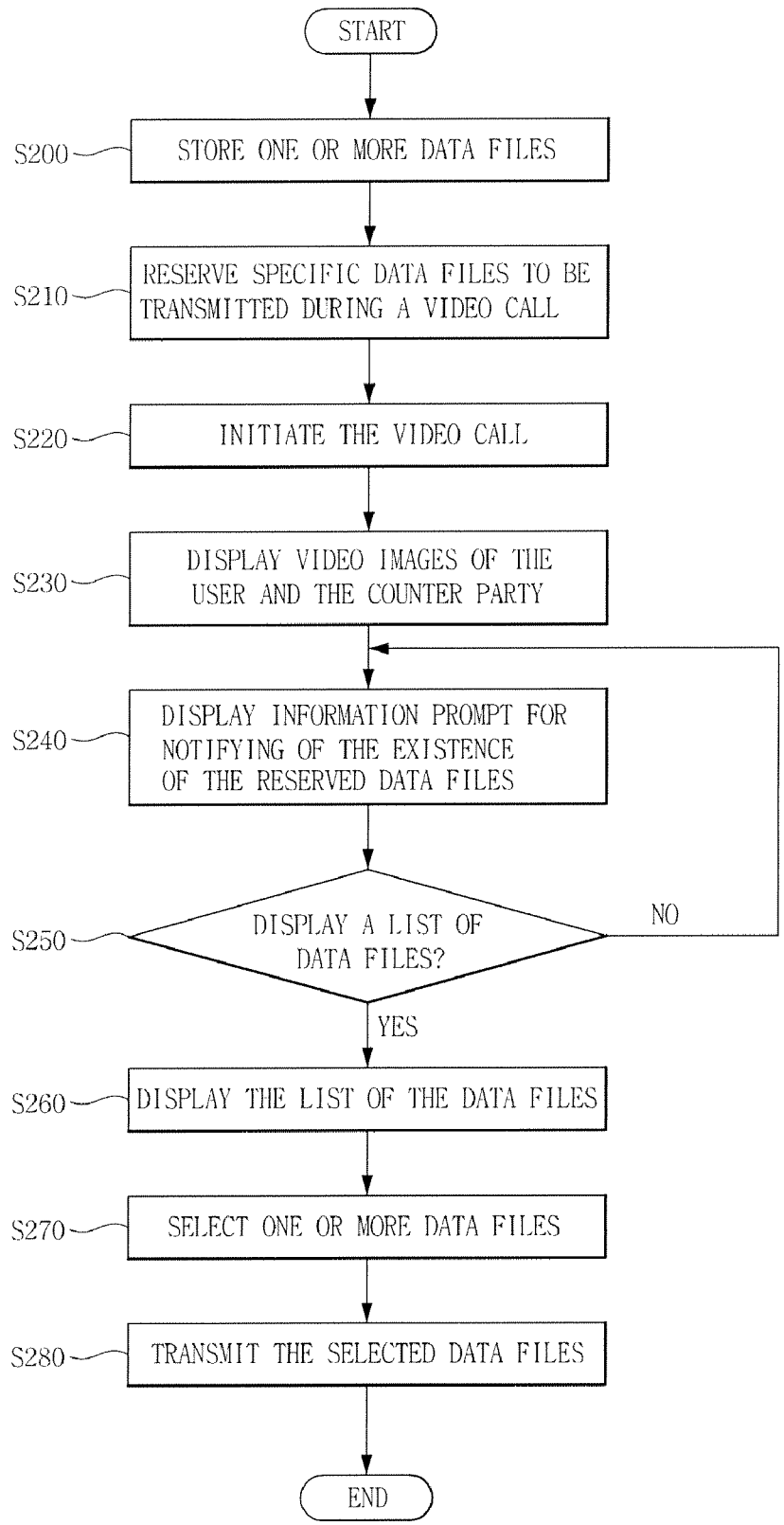
FIG. 2 is a flowchart illustrating a method for transmitting data files according to the present invention.
Figure 3A:
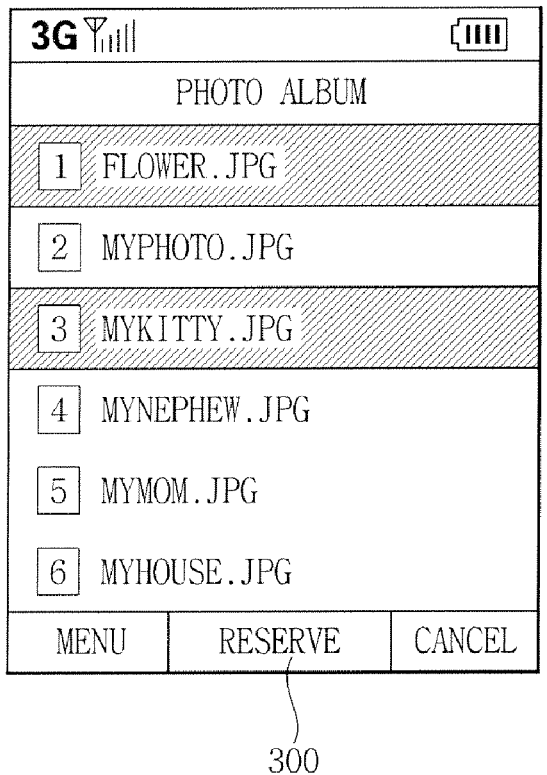
FIGS. 3A and 3B illustrate screens displaying lists of files to be reserved for transmission according to the present invention.
Figure 3B:
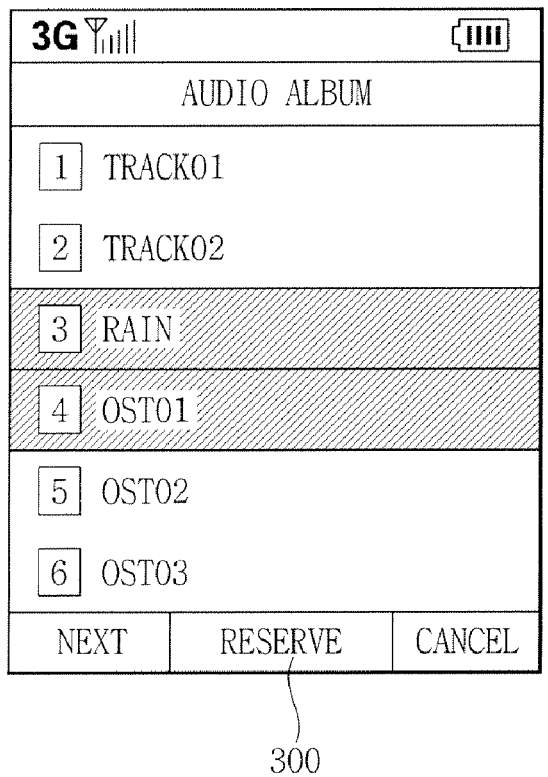

FIG. 2 is a flowchart illustrating a method for transmitting data files and FIGS. 3A and 3B illustrate screens displaying lists of files to be reserved for transmission during a video call.

Referring to FIG. 2, the method for transmitting data files include processes (steps S200 and S210) for reserving one or more data files to be transmitted during a video call, and processes (steps S220 through S280) for transmitting data for performing the video call with the reserved one or more data files.

Reserving and Transmitting Data Files.

The memory 110 stores at least one data file, such as a text file, an audio file, a moving picture file, and an image file (step S200). A user may select at least one data file stored in the memory 110 to transmit the selected data file during a video call.

For example, the user may select "flower.jpg" and "mykitty.jpg" files from a "photo album" menu as illustrated in FIG. 3A. The user may further select "rain" and "OST 01" files from an "audio album" menu. The selected data files are reserved or identified to be transmitted during a video call (step S210).

A video call is initiated as signals for the video call are transmitted and received with a call participant through the transceiver 105 (step S220).

The reserved data files may be transmitted during the video call as follows.

Figure 4A:
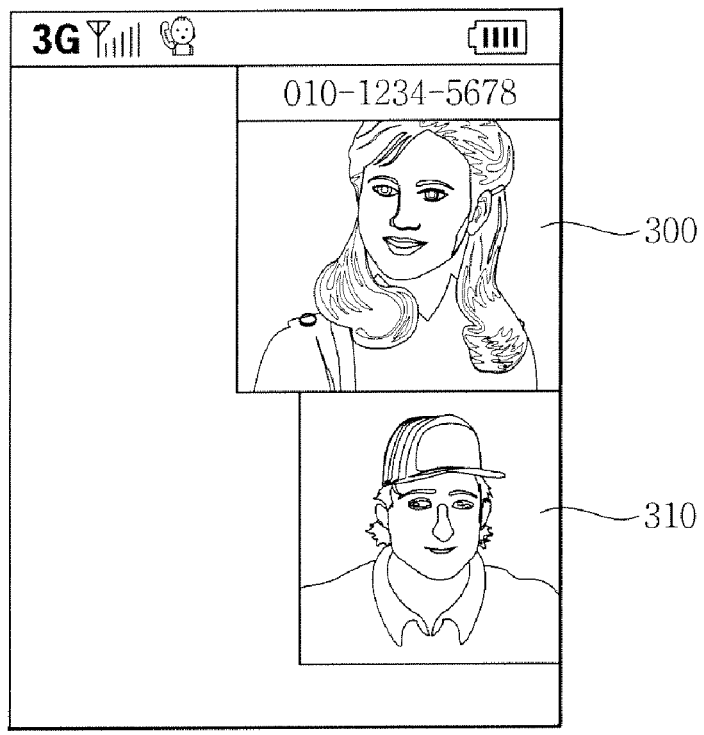
FIGS. 4A to 4E illustrate screens for transmitting the reserved files.

FIGS. 4A to 4E illustrate examples of screens for transmitting the reserved files. As illustrated in FIG. 4A, the controller 170 displays on the display 160 a video image 300 of the call participant received through the transceiver 105 and a video image 310 of the user captured by the camera unit 140 and processed by the image processor 150 (step S230) upon initiation of the video call.

Figure 4B:
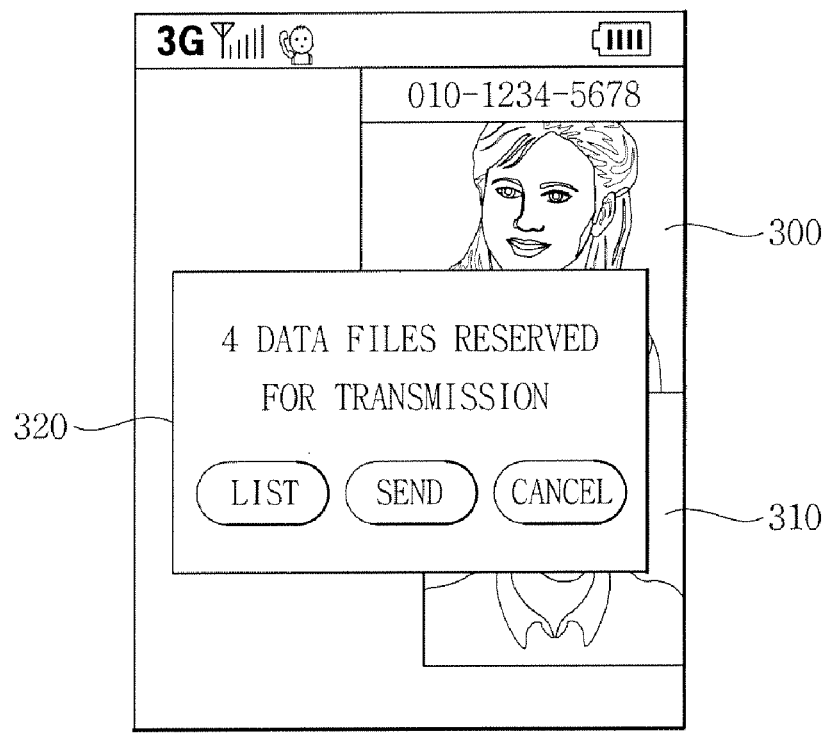

The controller 170 may provide an information prompt in the form of a pop-up window 320, as illustrated in FIG. 4B, for notifying the user that there are data files reserved for transmission during the video call (step S240). The pop-up window 320 is a separate screen to be displayed in the upper a part of the screen displaying the video images of the call participant 300 and the user 310.

Figure 4C:
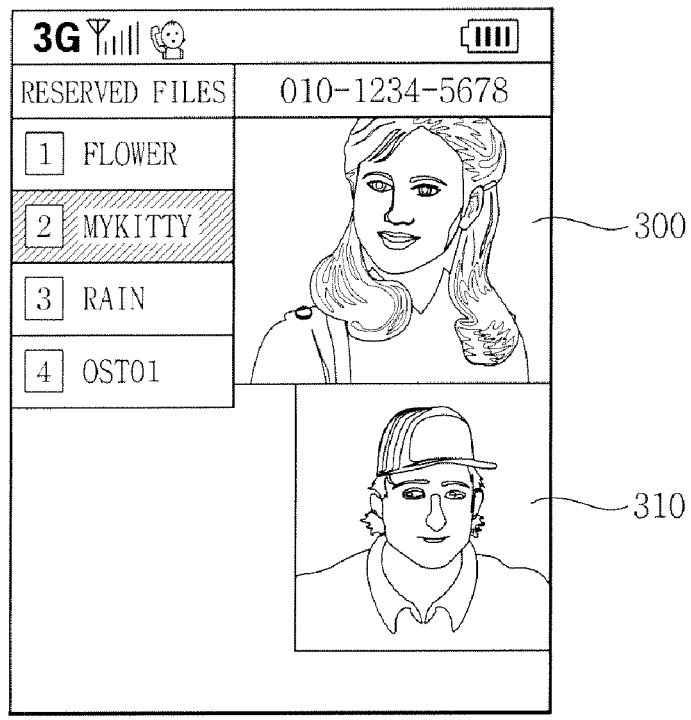
Figure 4D:
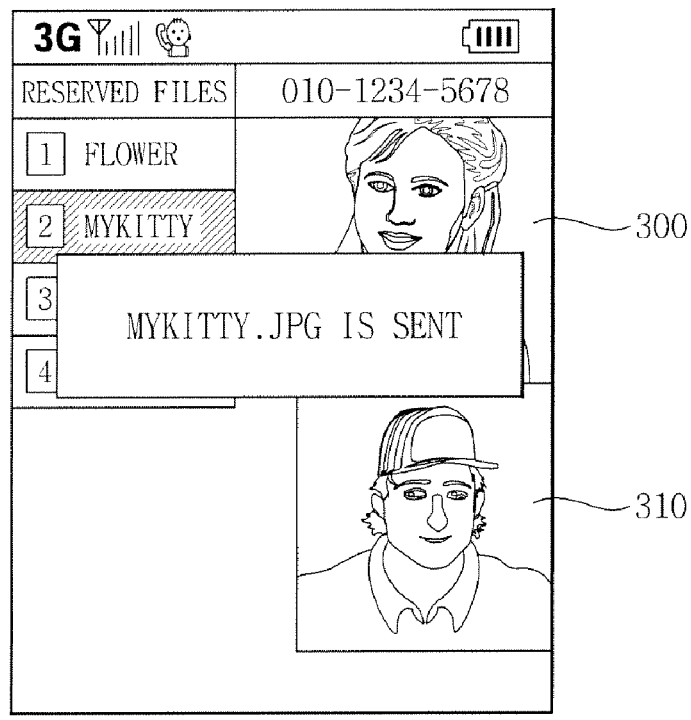

The controller 170 determines whether a "list" menu is selected through the input unit 120 to display a list of the reserved data files (step S250). Upon selection of the list menu, the controller 170 displays the list of the reserved data files (step S260), for example, at one end of the screen of the display 160, as illustrated in FIG. 4C. The controller 170 may display the list of the reserved data files in the form of a popup window.

The controller 170 receives user input to select at least one data file to be transmitted (step S270), for example, "mykitty" file among the list of the reserved data files through the input unit 120. Accordingly, the controller transmits the selected data file, the "mykitty" file in the above example, along with data for performing the video call such as voice data and video image data of the user to the call participant (step S280).

Figure 4E:
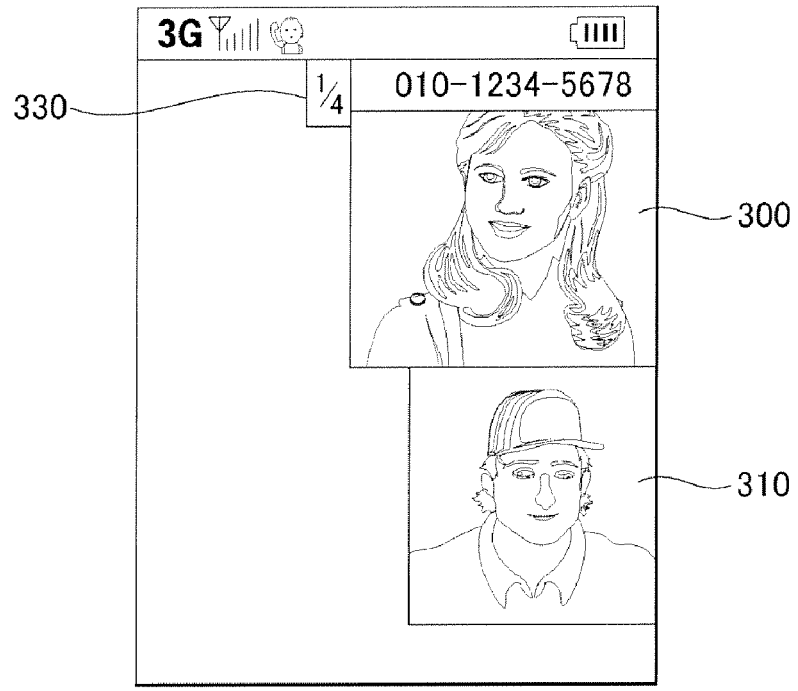

The controller may transmit the selected data file while a communication channel is connected for the video call but the data for performing the video call is not transmitted. The controller 170 may further create a multimedia message to which the selected data file is attached, and transmit the created multimedia message through a Multimedia Message Service (MMS). The controller 170 may display on the display 160 a notice 330, as illustrated in FIG. 4E, to notify the user of the number of the data files transmitted from the list of the reserved data files.

Figure 5A:
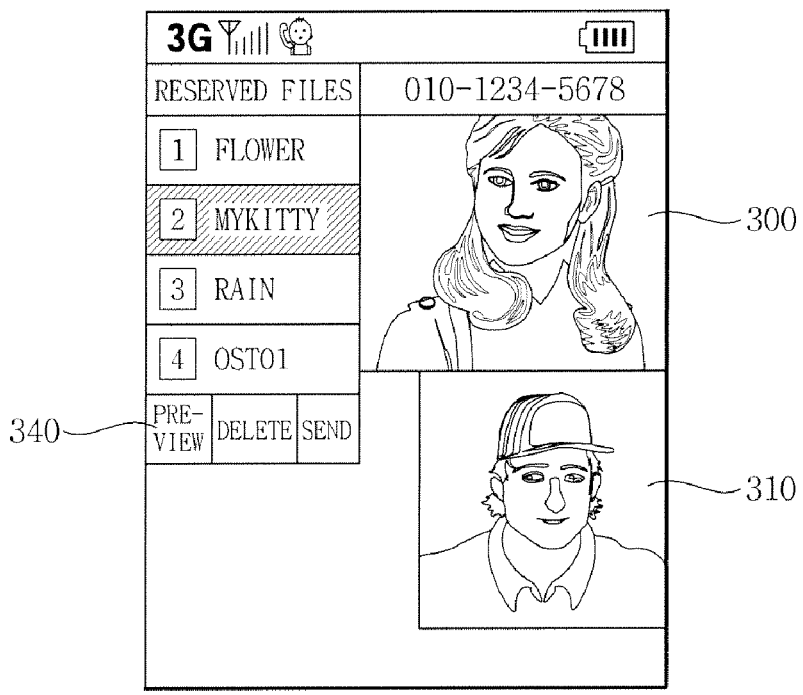
FIGS. 5A and 5B illustrate screens for previewing the reserved files.
Figure 5B:
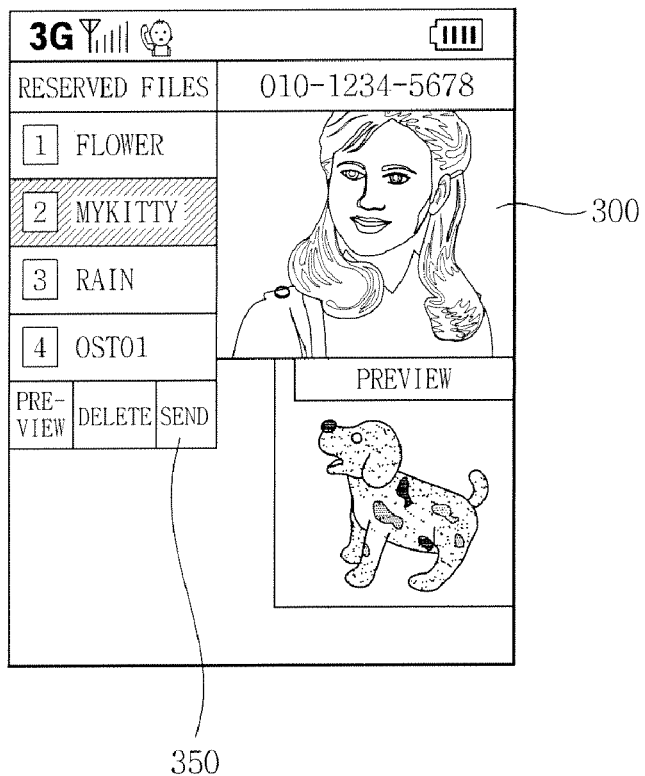

FIGS. 5A and 5B illustrate examples of screens for previewing the reserved files. As illustrated in FIG. 5A, the user selects a "preview" menu 340 through the input unit 120 to preview the "mykitty" file while the list of the reserved data files are displayed on the display 160.

The controller 170 may display a preview image of the "mykitty" file over the video image 310 of the user, as illustrated in FIG. 5B, to provide preview of the "mykitty" file to the call participant of the video call.

If the user selects a "send" menu 350 through the input unit 120 to transmit the selected data file upon request of the call participant, the controller 170 attaches the "mykitty" file to the multimedia message and transmits the multimedia message to the call participant through the MMS.

Figure 6A:
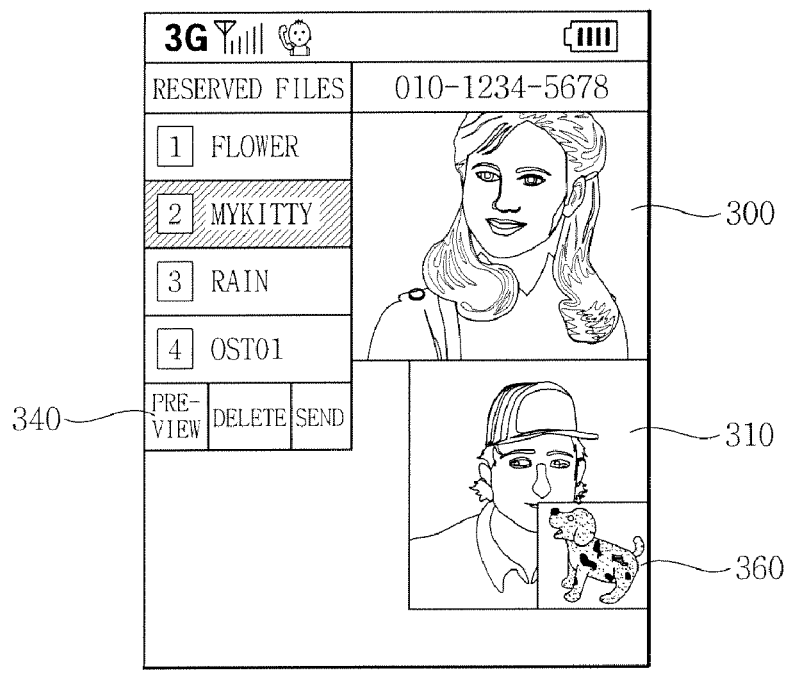
FIGS. 6A and 6B illustrate additional screens for previewing the reserved files.
Figure 6B:
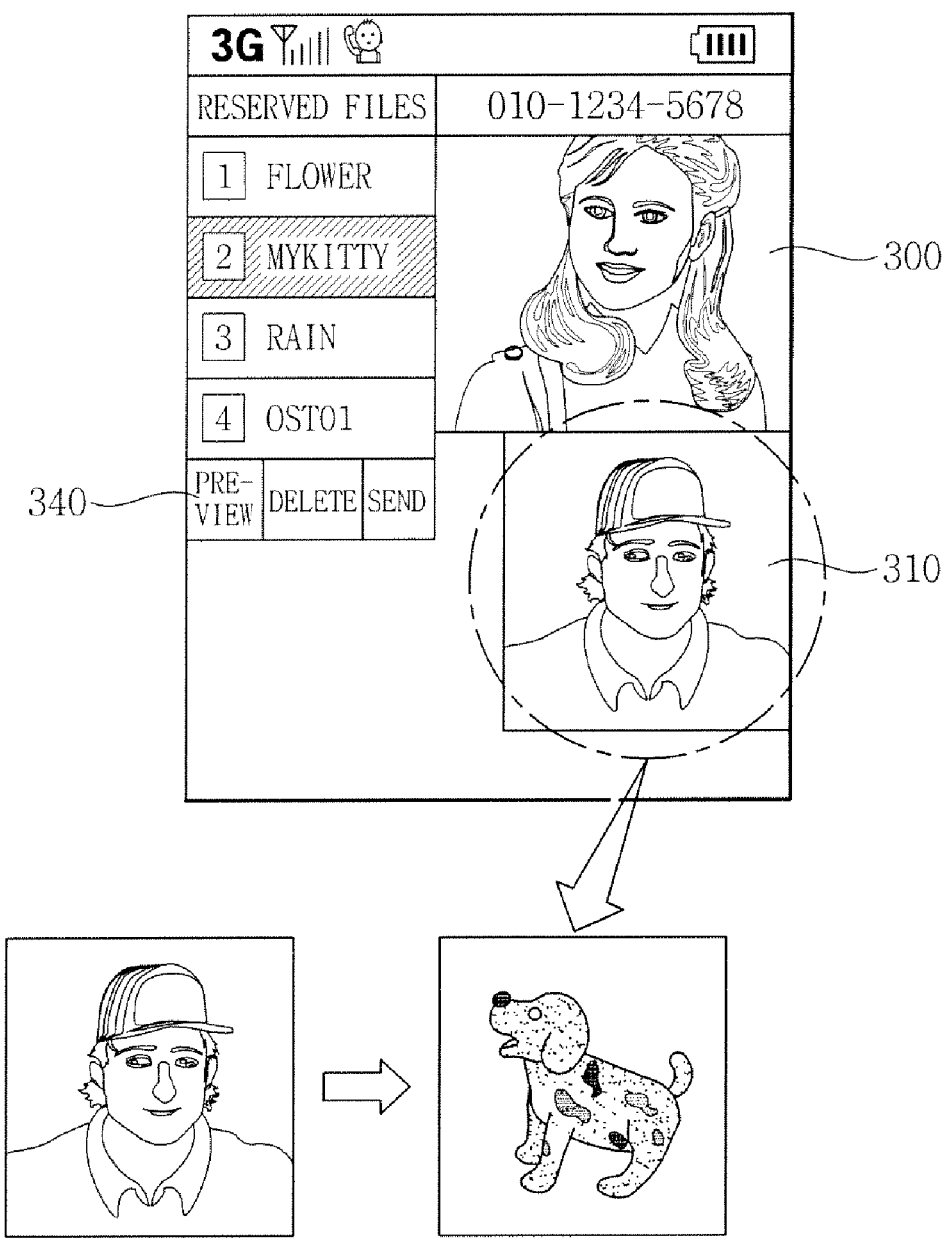

FIGS. 6A and 6B illustrate other examples of screens for previewing the reserved files. As illustrated in FIG. 6A, the controller 170 may display the selected one of the reserved data files, for example, the "mykitty" file, at a preview screen 360 inside the user's video image 310 through the Picture In Picture (PIP) feature. The PIP feature displays one image within a part of a screen displaying another image.

As illustrated in FIG. 6B, the controller may provide the preview of the "mykitty" file to the call participant of the video call by transmitting the preview image of the "mykitty" file along with the video image 310 of the user. The controller 170 may display the video image 310 of the user for a predetermined period and consequently the preview of the "mykitty" file for a different predetermined period. This may be repeated to provide the preview of the "mykitty" file to the call participant.

The above described examples may also be applied to an audio file reserved to be transmitted during the video call.

Figure 7A:
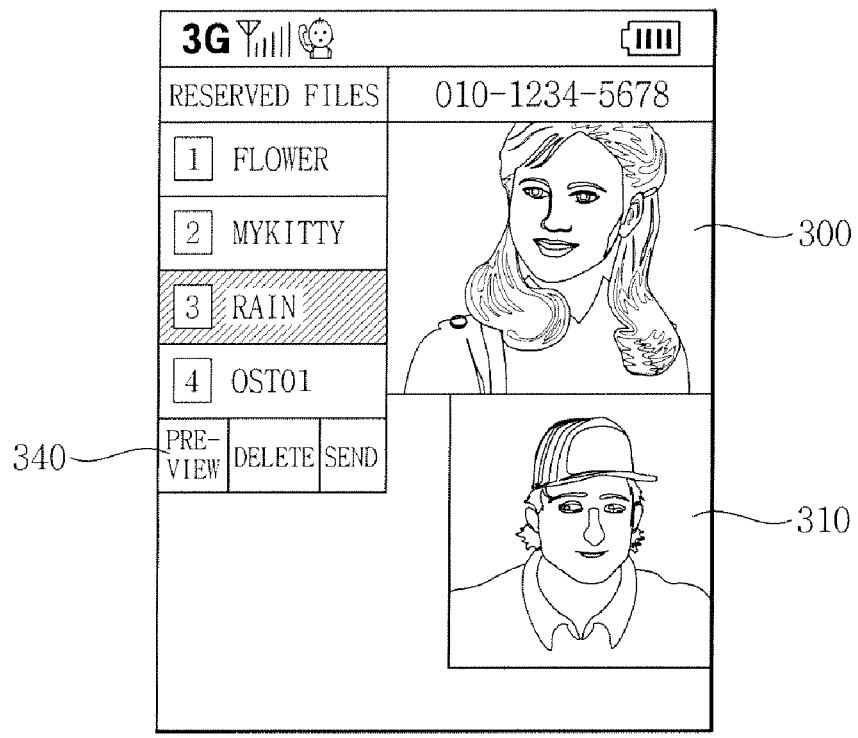
FIGS. 7A and 7B illustrate screens for previewing an audio file according to the present invention.
Figure 7B:
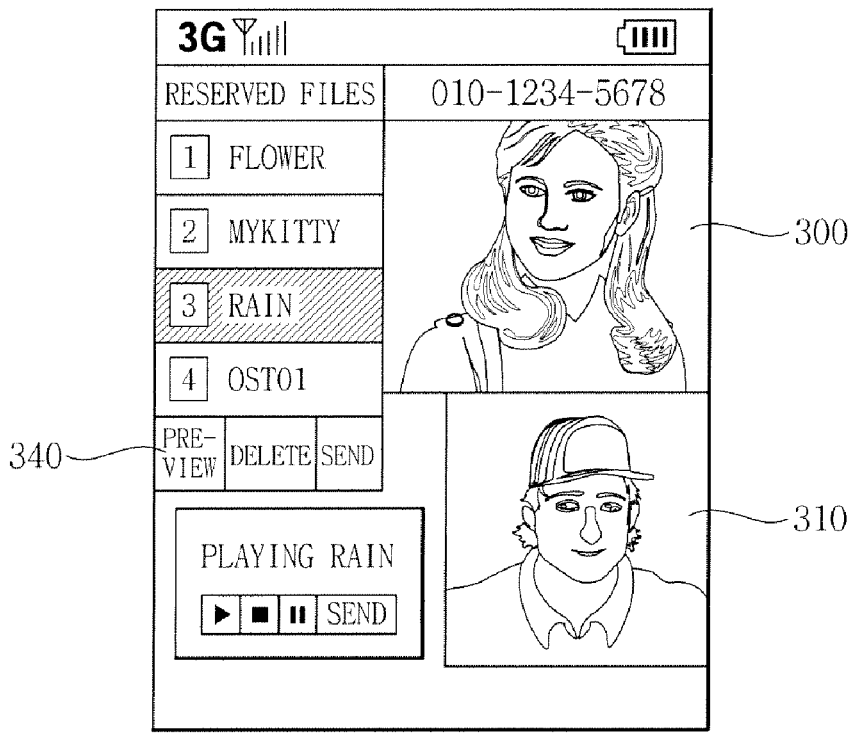

FIGS. 7A and 7B illustrate screens for previewing an audio file. As illustrated in FIG. 7A, the user selects the "preview" menu 340 through the input unit 120 to preview the "rain" file while the list of the reserved data files are displayed on the display 160.

The controller 170 may process the "rain" file to be reproduced through the audio processor 130 to output the processed sound signal through the speaker 180. The controller 170 may transmit the sound signal of the "rain" file to the call participant along with the video image 310 of the user to provide a preview of the "rain" file.

In practice, the sound signal of the "rain" may be output through the speaker 180 as background music for the video call and transmitted to the call participant for the preview.

Figure 8A:
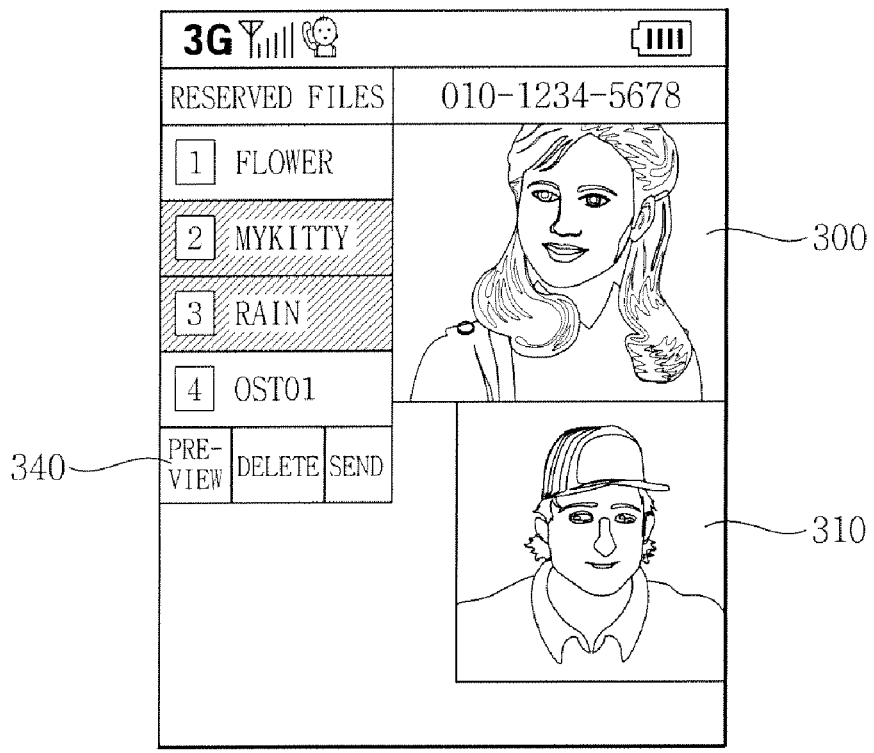
FIGS. 8A and 8B illustrate screens for previewing both an image file and an audio file.
Figure 8B:
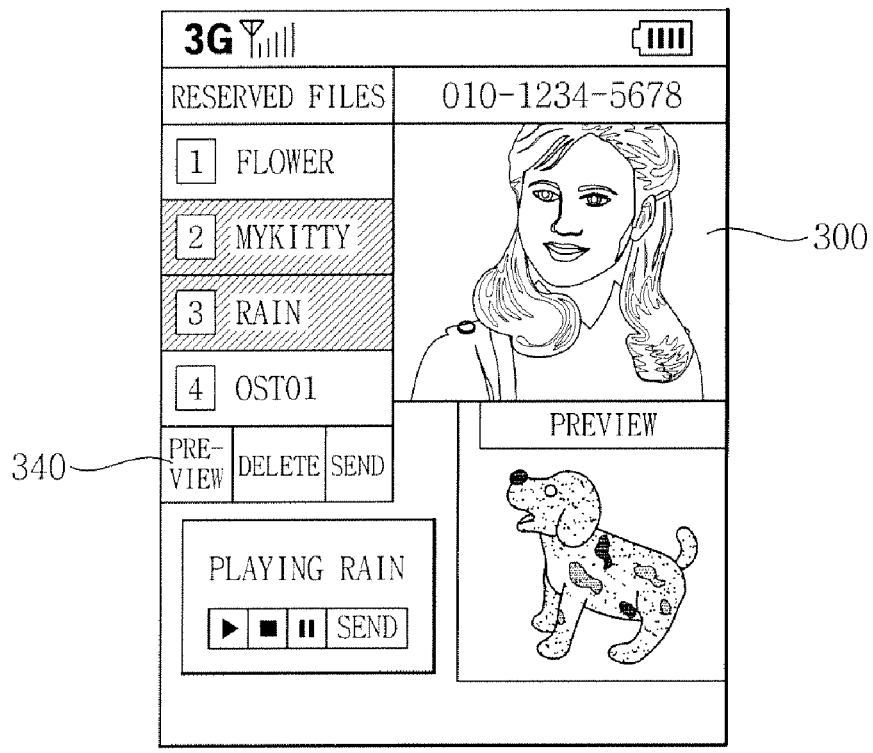

More than two data files may be previewed. FIGS. 8A and 8B illustrate examples of screens for previewing both an image file and an audio file.

As illustrated in FIG. 8A, the user selects the "preview" menu 340 through the input unit 120 to preview the "mykitty" file and the "rain" file while the list of the reserved data files are displayed on the display 160.

The controller 170 may display a preview image of the "mykitty" file, as illustrated in FIG. 8B, and process the "rain" file through the audio processor 130 to output the processed sound signals through the speaker 180 at the same time.

The controller may provide the previews of the "mykitty" file and the "rain" file to the call participant of the video call by transmitting the preview image of the "mykitty" file and the sound signal of the "rain" file to the call participant.

Displaying and transmitting of the preview image of the "mykitty" file may be performed similar to the examples described above. The reserved data files may be transmitted as attached to a multimedia message through the MMS.

Figure 9:
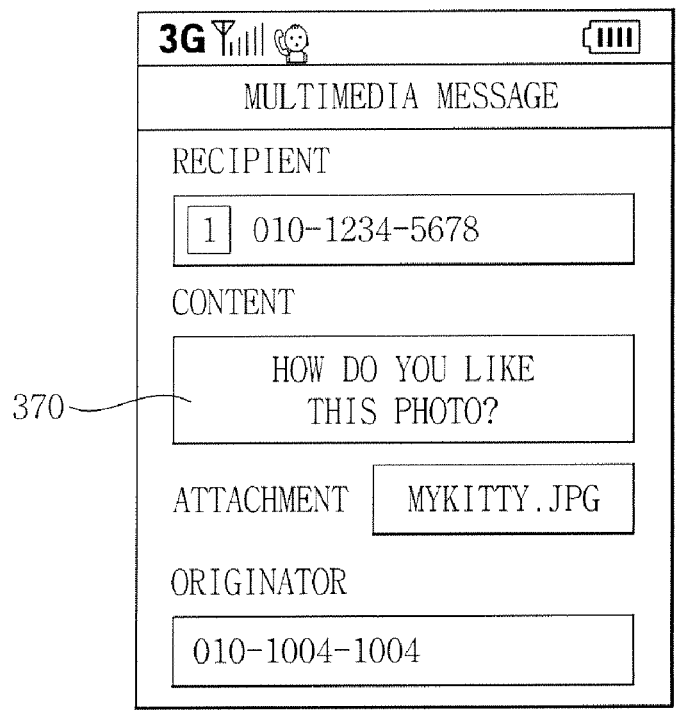
FIG. 9 illustrates a screen for creating a multimedia message to which a data file is attached.

FIG. 9 illustrates a screen for creating a multimedia message in which a data file is attached. As illustrated in FIG. 9, the user may select the "mykitty" file from the list of the reserved data files to be attached to a multimedia message through the input unit 120. Accordingly, the controller 170 may create the multimedia message in which the selected data file is attached, and transmit the created multimedia message through the MMS.

The phone number of the call participant of the connected video call may be input as a recipient phone number of the multimedia message.

The controller 170 may automatically add a preset phrase into content 370 of the multimedia message file. The preset phrase may depend on the type of the attached data file. For example, a preset phrase "How do you like this photo?" may be added into the multimedia message when the image data file is attached to the multimedia message.

Furthermore, a preset phrase "How do you like this music?" may be added into the multimedia message when the audio data file is attached to the multimedia message. The user may change the preset phrases. For example, the user may input a desired phrase to be added into the multimedia message during the video call.

Figure 10A:
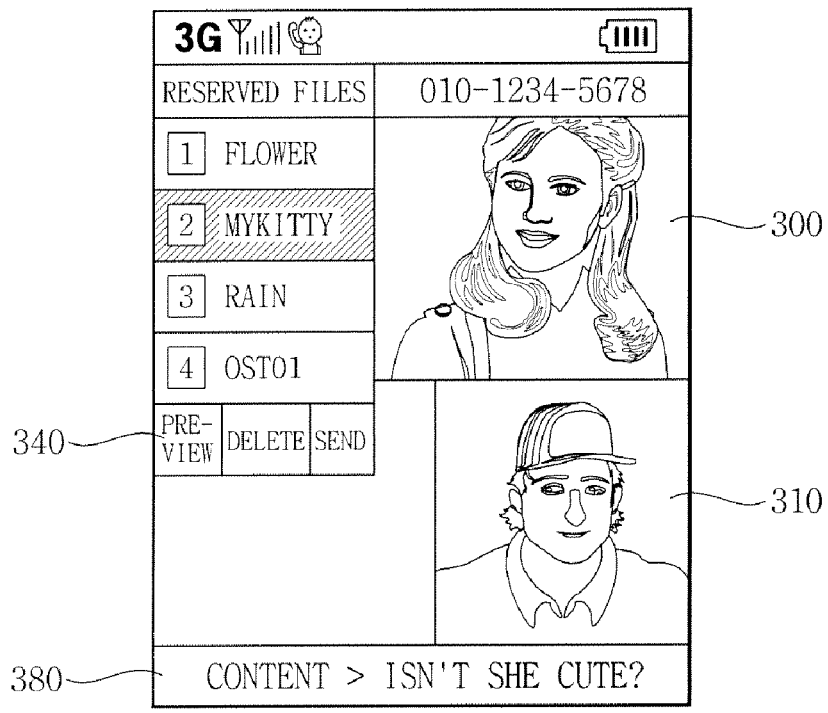
FIGS. 10A and 10B illustrate examples of screens for editing a multimedia message during a video call.
Figure 10B:
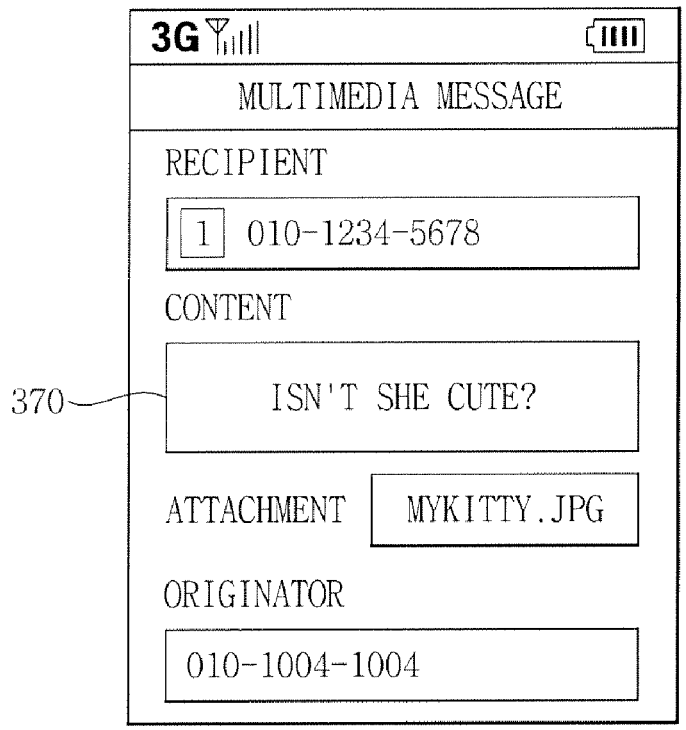

FIGS. 10A and 10B illustrate examples of screens for editing a multimedia message during a video call. As illustrated in FIG. 10A, the user may use the input unit 120 to select the "mykitty" file from the list of the reserved data files displayed on the display 160 to be attached to a multimedia message. Accordingly, the controller 170 may display an input window 380 at one end of the display 160 as illustrated in FIG. 10A.

If the user uses the input unit 120 to input a phrase "Isn't she cute?" at the input window 380, as illustrated in FIG. 10B, the controller 170 accordingly creates the multimedia message having the phrase "Isn't she cute?" as the content, and the "mykitty" file as the attachment to be transmitted to the recipient, the call participant of the video call.

One aspect of the data-transmitting technology of the present invention provides a method for transmitting the data files conveniently during a video call. The data files may be reserved in advance for transmitting the files to the call participant during a video call. Furthermore, the method may provide a preview of the reserved data files. This enables the user to enjoy the preview of the reserved data files with the call participant during the video call.

Reserving Data Files to be Transmitted to a Specific Phone Number.

Figure 11A:
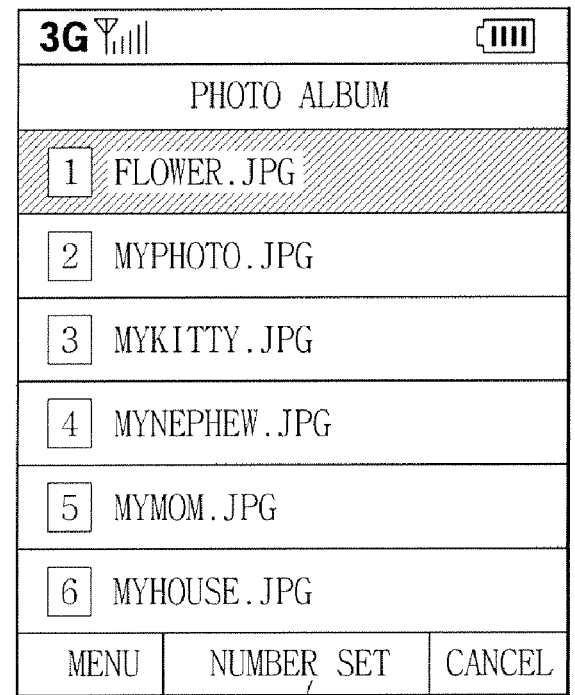
FIGS. 11A to 11C illustrate examples of screens for reserving data files to be transmitted to a specific phone number during a video call.
Figure 11B:
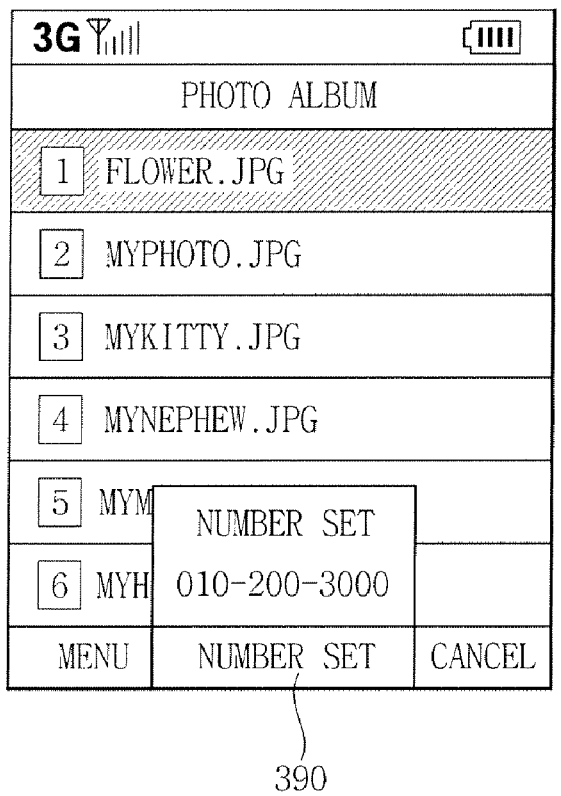
Figure 11C:
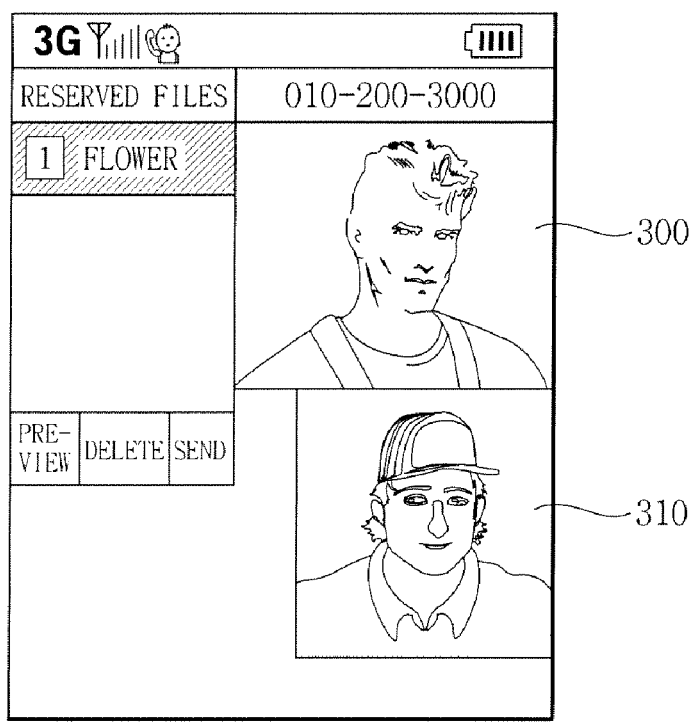

FIGS. 11A to 11C illustrate examples of screens for reserving data files to be transmitted to a specific phone number during a video call. As illustrated in FIG. 11A, the user may set a phone number to which the selected file, for example, the "flower" file is transmitted during a video call to the set phone number.

In this case, the controller 170 displays on the display 160 a "number setting" menu 390 to set the phone number, as illustrated in FIG. 11B, and receives the phone number "010-200-3000" inputted through the input unit 120.

If a video call is initiated with the set phone number later, the controller 170 displays the list of the reserved data files to be transmitted to the set phone number.

In the above example, the list of the reserved data files to be transmitted to the set phone number "010-200-3000" includes the "flower" file.

The controller 170 may provide preview of the "flower" file as described above. The controller 170 may transmit the "flower" file if the user selects the "send" menu upon request of transmission from a call participant of the phone number "010-200-3000" as illustrated in FIG. 11C.

Reserving Data Files to be Transmitted During a Conference Video Call.

The reserved data files may be transmitted to a plurality of call recipients simultaneously during a conference video call.

Figure 12:
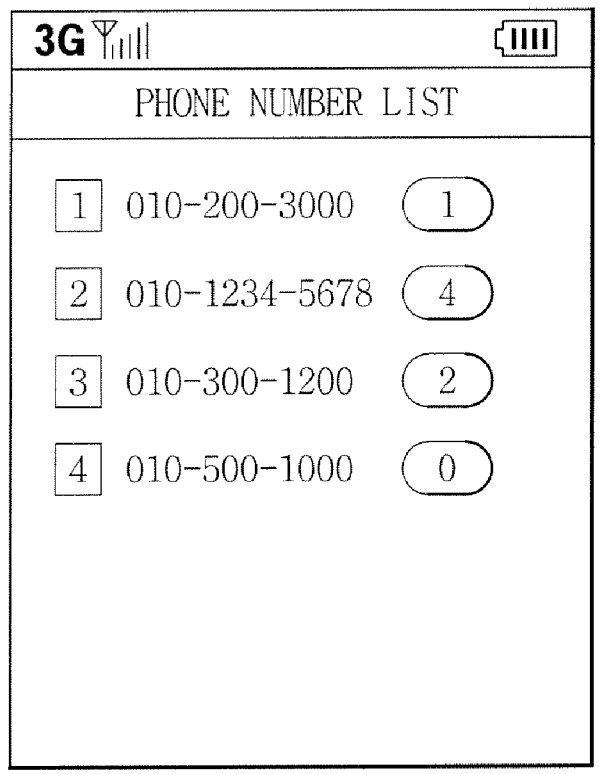
FIG. 12 illustrates a screen displaying a list of phone numbers to which data files are reserved for transmission.

FIG. 12 illustrates a screen displaying a list of phone numbers to which data files are respectively reserved to be transmitted. As illustrated in FIG. 12, the user may reserve data files for each of the phone numbers to be transmitted similar to the example described with reference to FIGS. 11A to 11C.

The controller 170 may separately store the phone numbers with the reserved data files in the memory 110, and provide a list of the phone numbers for facilitating the search of the phone numbers. The controller 170 may display the list of the phone numbers with the number of the reserved data files as illustrated in FIG. 12.

The user may connect a conference video call with a plurality of call participants and transmit the corresponding reserved data files to each of the call participants if the reserved data files are stored to be transmitted to each of the phone numbers of the call participants.

Figure 13A:
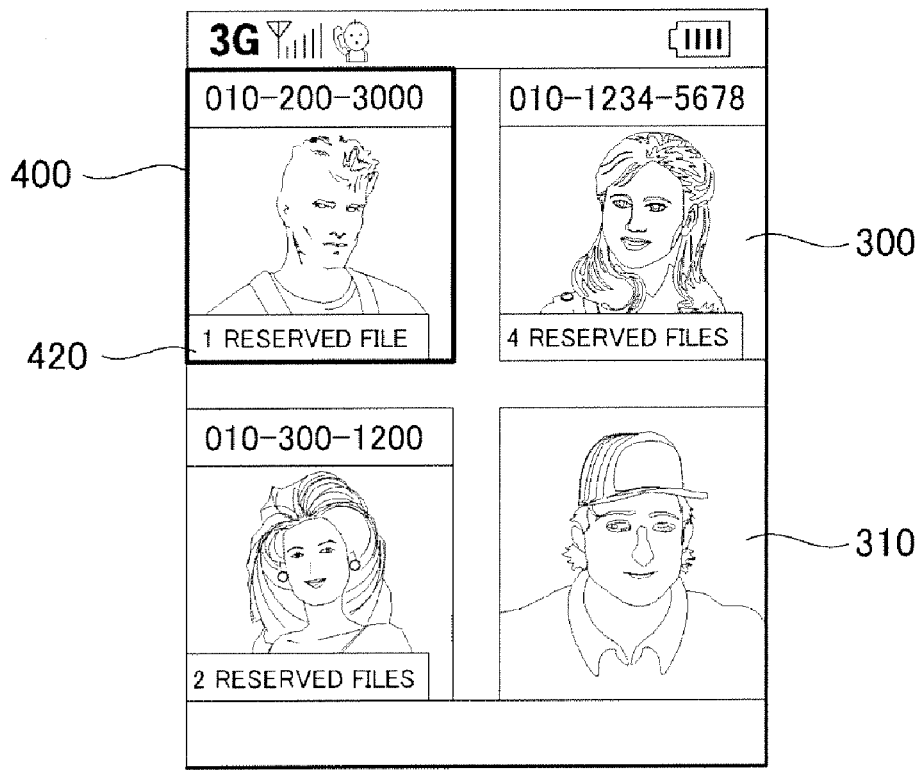
FIGS. 13A and 13B illustrate screens displaying a plurality of sub-screen areas for a conference video call in which data files are reserved to be transmitted to each of the call participants.
Figure 13B:
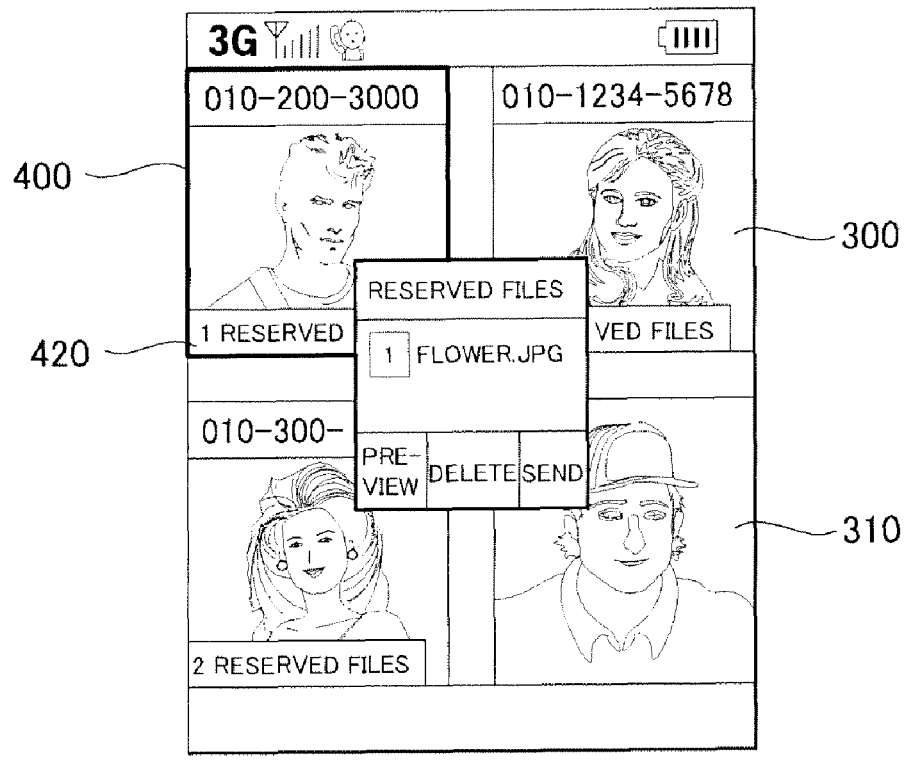

FIGS. 13A and 13B illustrate examples of screens displaying a plurality of sub-screen areas for a conference video call in which different data files are reserved to be transmitted to each of call participants.

As illustrated in FIG. 13A, phone numbers "010-200-3000", "010-1234-5678", and "010-300-1200" are selected for a conference video call to be connected and data files are correspondingly reserved to be transmitted to each of the phone numbers during the conference video call.

Upon initiating the conference video call, the controller 170 displays in the sub-screen areas video images of participants of the conference video call corresponding to the selected phone numbers. The controller 170 may display in each of the sub-screen areas a notification that there exist the reserved data files to be transmitted to each of the phone numbers.

The user may place a selection box 400 on a video image in one of the sub-screen areas to be selected. For example, in FIG. 13A, the video image corresponding to the phone number "010-200-3000" is selected by the selection box 400.

The controller 170 may accordingly display on the display 160 a list 420 of the reserved data files corresponding to the phone number "010-200-3000," as illustrated in FIG. 13B. The above descriptions of selecting and previewing of the reserved data files from the list may be applied similarly to the example herein.

In one aspect of the present invention, the display 160 may include a touch screen. Thus, the above described examples may be applied to the touch screen.

Reserving Data Files to be Transmitted Through the Touch Screen.

Figure 14:
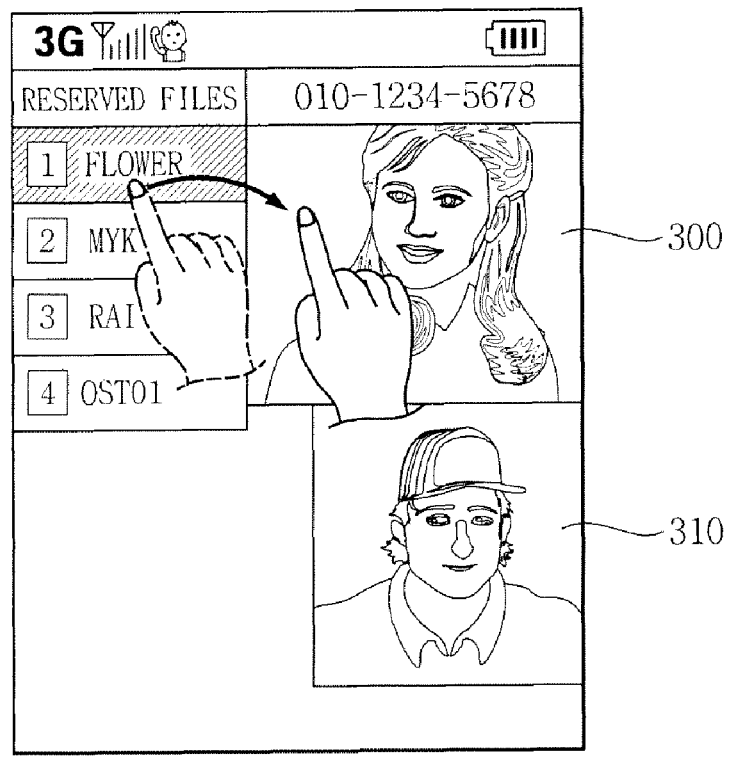
FIG. 14 illustrates a touch screen for transmitting a data file by dragging and dropping the data file.

FIG. 14 is an example of a touch screen for transmitting a data file by dragging and dropping the data file.

The controller 170 displays a list of the reserved data files at the touch screen which is implemented on the display 160. The "flower" file is touched to be dragged and dropped into a video image 300 of a call participant. Accordingly, the controller 170 may create a multimedia message by attaching the corresponding data file, the "flower" file in this example, thereto and transmit the created multimedia message to the call participant through the transceiver 105.

The user may drag and drop more than one data file. Thus, the controller 170 may create a multimedia message by attaching the more than one data file thereto.

The controller 170 may create a plurality of multimedia messages by attaching different numbers of data files respectively thereto. The plurality of the multimedia messages may be transmitted sequentially.

Figure 15A:
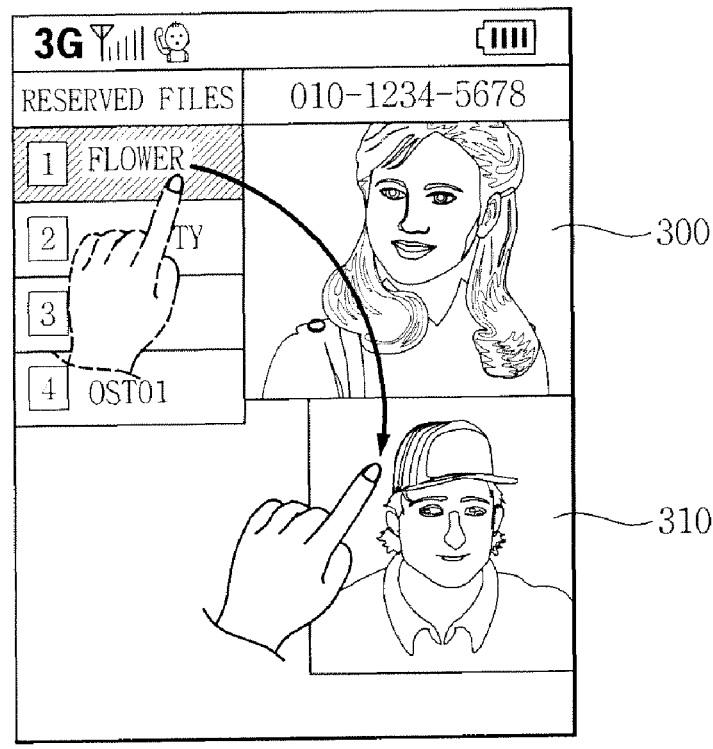
FIGS. 15A and 15B illustrate screens for previewing a data file by dragging and dropping the data file.
Figure 15B:
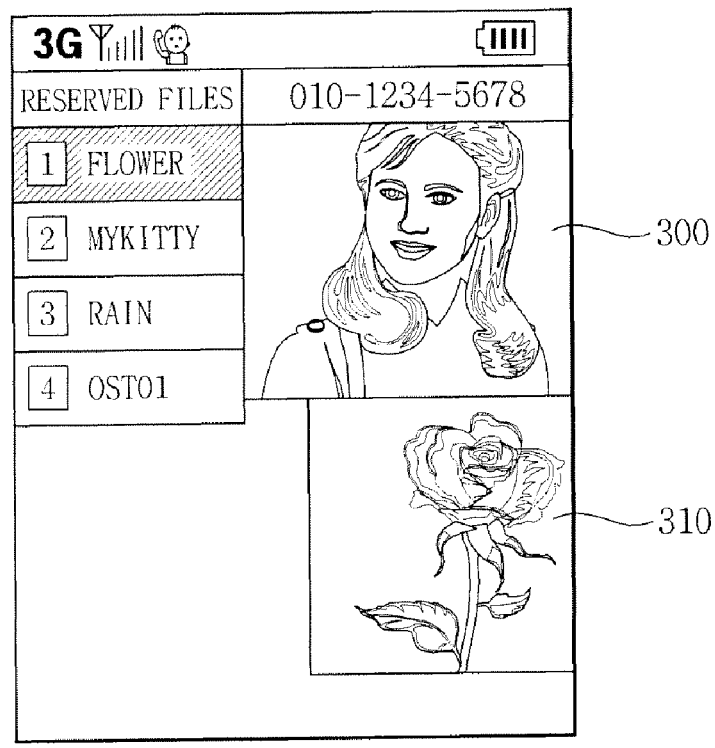

Preview of the reserved data files may be provided at the touch screen as follows. FIGS. 15A and 15B illustrate examples of screens for previewing a data file by dragging and dropping the data file. As illustrated in FIG. 15A, the user drags and drops at the touch screen the "flower" file from the list of the reserved data files into the video image 310 of the user.

Accordingly, the controller 170 reproduces the "flower" file to be displayed over the user's video image 310, as illustrated in FIG. 15B. The controller 170 may transmit the displayed image 310 of FIG. 15B to the call participant to provide the preview of the "flower" file. The image being previewed may be sent to the call participant by dragging and dropping the image into a video image 300 of the call participant.

The touch screen may provide convenience of selecting the reserved data files to be transmitted without troublesome manipulation of the device.

Similarly, the above example may be applied to an audio file. Thus, the reserved audio file may be dragged and dropped and the preview of the audio file may be provided as described above.

In the above descriptions, the reserved data files are image files or audio files. However, these are merely the examples of the data files to be reserved for transmitting during a video call. For example, additional data files, which may be reserved at the communication device 100 memory unit 110, include text files and moving picture files. Furthermore, the text files may include memo files containing the text.

The reserved data files may be attached to a Short Message Service (SMS) message to be transmitted if the attached data file is a text file. Furthermore, the reserved data files may be transmitted through an Enhanced Message Service (EMS), such as a Long Message Service (LMS).

In the preferred embodiment of the present invention, the reserved data files are selected by the user to be transmitted when the video call is initiated. However, other selection processes may also be used to reserve and transmit data. For example, the controller 170 may automatically transmit the reserved data files to the call participant when the video call is initiated.

For another example, the controller 170 may automatically transmit the reserved data files to the call participant immediately after a predetermined time lapse from the initiation of the video call. These settings may have variations of time for specific applications. For example, the data files may be reserved to be transmitted during a video call.

As disclosed above, a mobile communication terminal 100 is used to describe the various implementations of the present invention. However, these implementations may be applied to other devices, such as other communication terminals and electronic devices capable of performing video calling.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of wirelessly communicating data files via a mobile terminal having a video communication capability, the method comprising:
    associating at least one data file with at least one video call recipient;
    establishing a video link between the mobile terminal and a corresponding remote terminal associated with each of the at least one video call recipient;
    displaying a video image of the at least one video call recipient received through a transceiver, a video image of a user captured by a camera unit and a list comprising the associated at least one data file when the video link is established;
    selecting a first data file from the list for transmission to the at least one video call recipient;
    transmitting the selected first data file to each corresponding remote terminal while displaying the video image of the at least one video call recipient and the video image of the user; and
    displaying a notice comprising information for notifying the user about a number of transmitted data files.

2. The method of claim 1, further comprising:
    displaying a preview of the selected first data file on a display while the video link is maintained.

3. The method of claim 1, further comprising:
    transmitting the selected first data file to a plurality of video call recipients.

4. The method of claim 1, further comprising:
    selecting a second data file from the list for transmission to a second video call recipient.

5. The method of claim 1, wherein the first data file is at least an image, a moving picture, audio or a text file.

6. The method of claim 1, further comprising:
    displaying an image received from the at least one video call recipient in a first display area of the mobile terminal; and
    displaying the notice in a second display area of the mobile terminal.

7. The method of claim 6, further comprising:
    displaying a video image of the user in a third display area of the mobile terminal.

8. The method of claim 7, further comprising:
    displaying a preview of the selected first data file in the third display area.

9. The method of claim 1, wherein transmitting the selected first data file comprises transmitting the selected first data file via a Multimedia Message Service or an Enhanced Message Service.

10. The method of claim 1, wherein transmitting the selected first data file comprises transmitting the selected first data file via the video link.

11. The method of claim 1, further comprising:
    associating the first data file with a telephone number of the at least one video call recipient in response to selecting the first data file.

12. The method of claim 1, further comprising:
    providing a user interface for previewing the selected first data file.

13. A mobile terminal, comprising:
    a transceiver configured for receiving and transmitting data for performing a video call;
    a memory unit configured for storing a first data file;
    an input unit configured for receiving an input selecting the first data file for transmission to at least one video call recipient;
    a controller configured for:
        associating the first data file with the at least one video call recipient,
        controlling the transceiver to establish a video call with a corresponding remote terminal associated with each of the at least one video call recipient; and
        selecting the first data file from for transmission to the video call recipient;
        controlling the transceiver to transmit the selected first data file to each corresponding remote terminal when the video call has been established; and a display unit for:
- displaying a video image of the at least one video call recipient received through the transceiver, a video image of a user captured by a camera unit and a list comprising the associated first data file when the video call has been established, and
- displaying a notice comprising information notifying the user about a number of transmitted data files.

14. The mobile terminal of claim 13, wherein the controller is further configured for controlling the display unit to display a preview of the selected first date file while the video call is maintained.

15. The mobile terminal of claim 13, wherein the input unit is further configured for receiving an input selecting the first data file for transmission to a plurality of video call recipients.

16. The mobile terminal of claim 15, wherein:
- the memory unit is further configured for storing a second data file; and
- the input unit is further configured for receiving an input selecting the second data file for transmission to a second video call recipient.

17. The mobile terminal of claim 13, wherein the first data file is at least an image, a moving picture, audio or a text file.

18. The mobile terminal of claim 13, wherein the controller is further configured for controlling the display unit to display the notice in a first display area and an image received from the at least one video call recipient in a second display area.

19. The mobile terminal of claim 18, wherein the controller is further configured for controlling the display unit to display the video image of the user in a third display area.

20. The mobile terminal of claim 19, wherein the controller is further configured for controlling the display unit to display a preview of the selected first data file in the third display area.

21. The mobile terminal of claim 13, wherein the controller is further configured for controlling the transceiver to transmit the selected first data file via a Multimedia Message Service or an Enhanced Message Service.

22. The mobile terminal of claim 13, wherein the controller is further configured for associating the selected first data file with a telephone number of the at least one video call recipient.

23. The mobile terminal of claim 13, wherein the controller is further configured for controlling the display unit to display a user interface configured for previewing the selected first data file.

* * * * *